(12) United States Patent
Parnerkar et al.

(10) Patent No.: US 12,244,735 B2
(45) Date of Patent: Mar. 4, 2025

(54) COPY PROTECTION METHOD AND COPY-PROTECTED ELECTRONIC SYSTEM

(71) Applicant: ETO MAGNETIC GmbH, Stockach (DE)

(72) Inventors: Sharang Deepak Parnerkar, Stockach (DE); Heike Grefe, Stockach (DE)

(73) Assignee: ETO MAGNETIC GmbH, Stockach (DE)

( * ) Notice: Subject to any disclaimer, the term of this patent is extended or adjusted under 35 U.S.C. 154(b) by 261 days.

(21) Appl. No.: 17/919,827

(22) PCT Filed: Apr. 23, 2021

(86) PCT No.: PCT/EP2021/060742
§ 371 (c)(1),
(2) Date: Oct. 19, 2022

(87) PCT Pub. No.: WO2021/214325
PCT Pub. Date: Oct. 28, 2021

(65) Prior Publication Data
US 2023/0179430 A1    Jun. 8, 2023

(30) Foreign Application Priority Data

Apr. 24, 2020 (DE) ...................... 10 2020 111 281.5

(51) Int. Cl.
*H04L 9/32* (2006.01)
*H04L 9/30* (2006.01)
(Continued)

(52) U.S. Cl.
CPC .............. *H04L 9/3268* (2013.01); *H04L 9/30* (2013.01); *H04L 9/3263* (2013.01);
(Continued)

(58) Field of Classification Search
None
See application file for complete search history.

(56) References Cited

U.S. PATENT DOCUMENTS 8,639,627 B2    1/2014   Schnell et al.
9,479,329 B2 *  10/2016  Geiger ................. H04L 9/0866
(Continued)

FOREIGN PATENT DOCUMENTS

WO    2006/058387 A1    6/2006
WO    2007/148258 A2    12/2007

OTHER PUBLICATIONS

German Search Report issued Mar. 24, 2021 in corresponding German Patent Application No. DE 10 2020 111 281.5 (and English translation).

(Continued)

*Primary Examiner* — Lashonda Jacobs-Burton
(74) *Attorney, Agent, or Firm* — Posz Law Group, PLC

(57) ABSTRACT

A copy protection method for an electronic system has one or more electronic units and one or more component which interacts with the electronic unit, in which or more one public-key infrastructure having one or more certification authority is used. The certification authority issues a first certificate for the electronic unit and a second certificate for the component, based on an identification feature of the electronic unit and of the component, respectively. To check authenticity of the component by means of the electronic unit, the respective certificates are mutually checked. The first certificate is premade and loaded onto the electronic unit when producing and/or configuring the electronic unit, and/or the second certificate is premade and loaded onto the component when producing and/or configuring the component.

23 Claims, 5 Drawing Sheets

Figure 1:
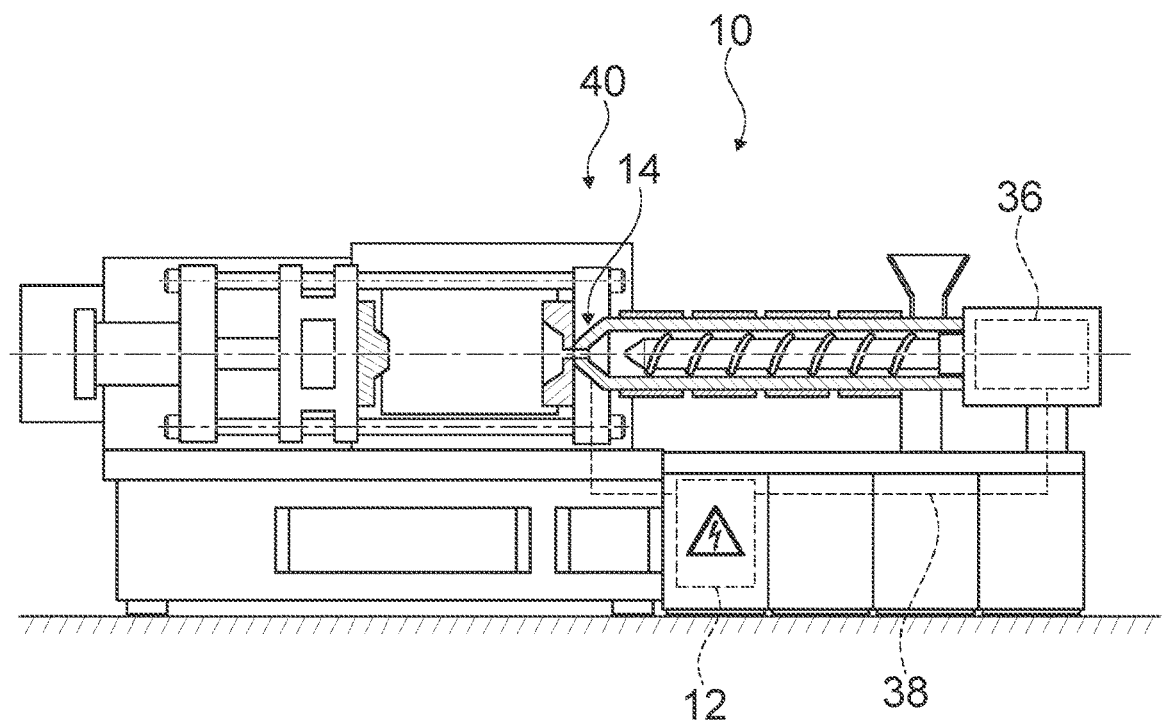

(51) Int. Cl.
    *H04L 9/40*      (2022.01)
    *G06F 21/33*     (2013.01)
(52) U.S. Cl.
    CPC .......... *H04L 63/0823* (2013.01); *G06F 21/33* (2013.01); *H04L 2209/84* (2013.01)

(56) References Cited

U.S. PATENT DOCUMENTS

| | | | | |
|---|---|---|---|---|
| 10,749,680 | B1* | 8/2020 | Troia | B60R 25/24 |
| 11,153,102 | B2* | 10/2021 | Young | H04L 9/3073 |
| 2002/0078347 | A1* | 6/2002 | Hericourt | H04L 9/321 |
| | | | | 713/156 |
| 2004/0003227 | A1* | 1/2004 | Reinold | H04L 9/40 |
| | | | | 713/155 |
| 2004/0003232 | A1* | 1/2004 | Levenson | H04L 9/3247 |
| | | | | 713/155 |
| 2004/0003249 | A1* | 1/2004 | Dabbish | H04L 9/3247 |
| | | | | 713/170 |
| 2011/0154024 | A1* | 6/2011 | Ignaci | H04L 63/0823 |
| | | | | 713/156 |
| 2014/0136849 | A1* | 5/2014 | Hueger | H04L 9/3263 |
| | | | | 713/175 |
| 2017/0111177 | A1* | 4/2017 | Oguma | H04L 9/3273 |
| 2019/0349201 | A1 | 11/2019 | Fuerstner | |
| 2020/0374123 | A1 | 11/2020 | Troia et al. | |

OTHER PUBLICATIONS

International Search Report of the International Searching Authority mailed Jul. 28, 2021 in corresponding international application No. PCT/EP2021/060742 (English Translation Only).

International Preliminary Report on Patentablility of the International Searching Authority mailed Oct. 25, 2022 in corresponding international application No. PCT/EP2021/060742 (and partial English translation).

* cited by examiner

COPY PROTECTION METHOD AND COPY-PROTECTED ELECTRONIC SYSTEM

CROSS REFERENCE TO RELATED APPLICATIONS

This application is a U.S. national stage application of PCT/EP2021/060742 filed on Apr. 23, 2021, which claims priority from and incorporates herein by reference the German patent application DE 10 2020 111 281.5 filed on Apr. 24, 2020.

PRIOR ART

The invention relates to a copy protection method and to a copy-protected electronic system.

Asymmetrical copy protection methods in which certificates are requested and transmitted from a certification authority via an Internet connection are already known. However, such copy protection methods cannot be used offline and may be susceptible to man-in-the-middle attacks.

The object of the invention is, in particular, to establish a high degree of operational reliability of electronic systems, in particular by ensuring, by means of a generic method, that solely original components can be used in the electronic systems.

ADVANTAGES OF THE INVENTION

The invention is based on a copy protection method, in particular an offline-capable copy protection method, for an electronic system having at least one, in particular central and/or superordinate, electronic unit and having at least one component which interacts with the electronic unit, in which at least one public-key infrastructure having at least one certification authority is used, wherein the certification authority issues at least one first certificate for the electronic unit on the basis of an identification feature of the electronic unit and at least one second certificate for the at least one component on the basis of an identification feature of the at least one component, and wherein, in order to check authenticity at least of the at least one component by means of the electronic unit, the respectively associated certificates are at least mutually checked.

It is proposed that at least the first certificate is premade, in particular offline, and is loaded onto the electronic unit, in particular offline, when producing the electronic unit and/or when configuring the electronic unit, and/or that at least the second certificate is premade, in particular offline, and is loaded onto the at least one component, in particular offline, when producing the at least one component and/or when configuring the at least one component. This advantageously makes it possible to achieve a high degree of operational reliability of electronic systems, in particular of electronic systems without a data connection to a certification authority and/or without an Internet connection. This advantageously makes it possible to check the authenticity of components of the electronic system offline. This advantageously makes it possible to preclude man-in-the-middle attacks, in particular also man-in-the-middle attacks in which the man-in-the-middle is between a certification authority and the component or the electronic unit. Effective copy protection advantageously makes it possible to protect from products which are structurally identical at first glance, for example spare parts, wear parts or consumable materials, but are of low quality, have inadequate safety and/or have a short service life.

A "copy protection method" should be understood as meaning, in particular, a method which is provided for the purpose of detecting and/or preventing use of non-original parts, in particular non-certified structural parts/components and/or forgeries, in the electronic system. In particular, the copy protection method is a method for identifying and/or verifying certified structural parts, in particular components, of an electronic system and/or original parts. The copy protection method is preferably a method for controlling the operation of an electronic system, which, if non-original parts, in particular non-certified structural parts/components and/or forgeries, are detected, blocks and/or prevents operation of the electronic system. The copy protection method is preferably a method for checking authenticity of a component which interacts with an electronic unit, wherein interaction between the electronic unit and the component is permitted, in particular, only when the authenticity of the component has been successfully verified.

An "offline-capable copy protection method" should be understood as meaning, in particular, a copy protection method which is provided for the purpose of verifying authenticity of a component of an electronic system without having to access an Internet server and/or having to communicate with an Internet server. In particular, the offline-capable copy protection method is provided for the purpose of checking the authenticity of components of the electronic system solely by means of an internal test inside the electronic system, in particular solely by means of internal data communication which remains within the electronic system. It is additionally conceivable for the electronic system to also have an online functionality which, however, is irrelevant to a functionality of the offline-capable copy protection method. "Provided" should be understood as meaning, in particular, specially programmed, designed and/or equipped. The fact that an object is provided for a particular function should be understood as meaning, in particular, the fact that the object performs and/or carries out this particular function in at least one application and/or operating state.

The electronic system is, in particular, implemented as an electronic apparatus, in particular any desired electrical device, in which at least two electronic structural parts interact with one another, preferably electronically. For example, the electronic system could be implemented as an injection molding machine, wherein the electronic unit, for example, is a control device of the injection molding machine, and wherein the component, for example, is a valve, in particular a valve controlled by the control device, in particular a solenoid valve, for example a solenoid valve of a shut-off nozzle of an injection molding machine, or an electric motor, in particular an electric motor controlled by the control device, or the like. For example, the electronic system could be implemented as a vehicle, in particular implemented as a vehicle which drives in an at least partially autonomous manner or fully autonomous manner, wherein the electronic unit, for example, is a control device of the vehicle, and wherein the component, for example, is a sensor, in particular a sensor controlled by the control device, a component control device, in particular a component control device controlled by the control device, and/or an electric motor, in particular an electric motor controlled by the control device, or the like. For example, the electronic system could be implemented as a (mobile) computer system, in particular as a smartphone, a tablet or a laptop, wherein the electronic unit, for example, is a central computing unit of the computer system, and wherein the component, for example, is a rechargeable battery, in particular a rechargeable battery equipped with an electronic cryptographic module for carrying out the copy protection method, earphones, in particular earphones equipped with the electronic cryptographic module for carrying out the copy protection method, and/or a charging cable, in particular a charging cable equipped with the electronic cryptographic module for carrying out the copy protection method, or the like. A multiplicity of further examples are possible. In particular, the copy protection method comprises an asymmetric cryptographic system. Alternatively, however, it is also conceivable for the copy protection method to comprise a symmetrical cryptographic system.

"Interaction of a component with the electronic unit" should be understood as meaning, in particular, mechanical interaction and/or preferably signaling, preferably electronic and/or radio, interaction. In particular, the electronic unit is embodied as an electronic unit superordinate to the component. The electronic unit is preferably embodied as a central electronic unit which is provided for the purpose of controlling and/or managing the electronic system, in particular the electronic device. In particular, it is conceivable for the electronic system to at least temporarily have at least a partial functionality even without the component. In particular, the component is functional only in combination with the electronic unit. A "public-key infrastructure" should be understood as meaning, in particular, a cryptographic system in which digital certificates are issued, distributed and checked. In particular, at least part of data communication within the public-key infrastructure is digitally signed and encrypted. The certificates used within the public-key infrastructure are preferably used to protect computer-aided communication within the electronic system. In particular, the public-key infrastructure comprises a set of rules, guidelines and/or procedures as well as hardware and software for issuing, managing, distributing, using, storing and revoking digital certificates and for managing encryption. The public-key infrastructure preferably comprises at least the certification authority. In particular, the certification authority is realized as an offline certification authority. In particular, the certification authority is arranged in a specially protected environment, for example an access-restricted environment and/or an environment monitored using security technology. In particular, the certification authority is free from a data communication line which connects the certification authority directly or indirectly to the Internet. In particular, data are input to the certification authority and/or data are output by the certification authority in an at least partially manual manner and/or independently of the electronic system, in particular independently of the electronic unit and/or component to be certified, and/or in a manner free from a signaling connection to the electronic system, in particular to the electronic unit and/or component to be certified. In particular, the certificate issued by the certification authority for the electronic unit or for the component is premade, that is to say is loaded onto the component and/or the electronic unit, in particular before the component and/or the electronic unit is/are started up for the first time. In particular, the certificate issued by the certification authority for the electronic unit or for the component is loaded onto the electronic unit and/or the component when flashing the electronic unit and/or the component. The certificate issued by the certification authority for the electronic unit or for the component is preferably transmitted to the electronic unit and/or to the component offline, for example by means of a physical data storage medium (CD, USB stick, SD card, or the like). In particular, it is also conceivable for the certificate of the electronic unit to be pre-installed on a hardware element which is provided for the purpose of carrying out the copy protection method and is connected to an IO pin of the electronic unit when configuring the electronic unit. In particular, a key pair comprising a public key and a private key, which is associated with the certificate, is concomitantly transmitted with the certificate, for example by means of the same or a further physical data storage medium, and/or is pre-installed on the hardware element. Alternatively, it is conceivable for a software patch to be loaded onto an electronic unit (control device) which has already been installed and/or is operating, which software patch requires and/or enables (offline) input of the certificate issued by the certification authority for the electronic unit. The software patch is preferably provided for the purpose of operating on a user level, with the result that no real-time-relevant software and/or critical system applications advantageously has/have to be interrupted when subsequently loading the software patch.

In particular, the certification authority is a certification entity and/or a certification body provided for the purpose of issuing digital certificates. In particular, the first certificate and/or the second certificate is/are a digital certificate. In particular, the digital certificate of a component/the electronic unit comprises at least one item of information relating to a cryptographic key of the component/the electronic unit, in particular relating to a public key of the component/the electronic unit, at least one identification feature of the component/the electronic unit and a digital signature of the certification authority. The digital certificate of the component/the electronic unit may additionally comprise a public key of the certification authority. In addition, the digital certificate may comprise information relating to a validity period of the digital certificate and/or relating to an area of validity and/or application of the digital certificate. The identification feature of the component/electronic unit preferably uniquely identifies the component/electronic unit. The identification feature of the component/electronic unit may be implemented as a serial number of the component/electronic unit, for example.

The electronic unit is preferably connected to the at least one component, in particular at least to a cryptographic module of the at least one component, using data transmission technology. The electronic unit may additionally be connected to further, in particular identical or different, components using data transmission technology. In this context, "connected using data transmission technology" should be understood as meaning, in particular, connected in a wired manner and/or connected by radio. In particular, the connection using data transmission technology is at least provided for the purpose of transmitting at least the respectively associated certificates between the electronic unit and the at least one component for the purpose of mutual checking. In particular, the second certificate is checked by the electronic unit for authenticity. In particular, the first certificate is checked by the at least one component for authenticity. Alternatively or additionally, it is conceivable for at least some of the parts of the public-key infrastructure, for example the public key of the certification authority, or the premade certificates and/or the keys associated with the component and/or the electronic unit, to be transmitted between the at least one component and the electronic unit via an Internet connection.

The fact that a certificate is intended to be loaded "when producing" should be understood as meaning, in particular, the fact that the certificate is loaded at least before an initial start-up and/or before installation, preferably in at least one production step at a production site. The fact that a certificate is loaded "when configuring" should be understood as meaning, in particular, the fact that the certificate is loaded during programming and/or during setting, preferably when loading the software patch. In particular, it is conceivable, in an installation process in which the software patch is loaded onto the electronic unit, for the certificate, which is preferably transmitted on a separate offline medium, and/or the key pair comprising the public key and the private key associated with the electronic unit to be requested and, in particular, for the installation of the software patch to be able to be concluded only after successful input. In particular, each certificate and/or each key pair may be allocated only once or may be assigned only to a single component/electronic unit. In particular, the identification feature, for example the serial number, which was used when issuing the certificate, is also requested during the installation process for the purpose of verification. Alternatively, it is also conceivable for the certificate to be loaded onto the electronic unit during configuration by virtue of a hardware element, on which the certificate is stored, being connected to the electronic unit, in particular to the PLC or to the ECU, preferably via IO pins of the electronic unit. In this case, the hardware element is provided, in particular, for the purpose of transmitting a simple signal, which confirms or denies authenticity of a component, to the electronic unit. As a result, programming effort on the electronic unit, in particular PLC programming effort or ECU programming effort, can be advantageously kept low. The hardware element may communicate with the at least one component, in particular in a wired manner or by radio, for the purpose of carrying out the copy protection method, preferably at least for the purpose of transmitting the certificates. For this purpose, the hardware element preferably has at least one radio module.

It is also proposed that at least the identification feature of the electronic unit that is used to issue the first certificate is transmitted to the certification authority via an (arbitrary) transmission path that is independent from electronic data connections of the electronic unit. Particularly reliable copy protection can be advantageously achieved as a result. Overcoming the copy protection can be advantageously rendered virtually impossible. A risk of susceptibility to man-in-the-middle attacks can be advantageously considerably reduced. In particular, the identification feature of the electronic unit that is used to issue the first certificate, for example the serial number of the electronic unit, is transmitted to the manufacturer of the electronic unit and/or to the service provider configuring the electronic unit by means of the software patch or by means of the hardware element via a channel that is independent from the electronic unit. Such a channel may be effected, for example, by mail, by oral communication, by sending a physical data storage medium or the hardware element which can be installed on the electronic unit or using an electronic mode of dispatch, for example by email, as long as this electronic mode of dispatch is separate from the electronic unit.

It is also proposed that a specific public key of the public-key infrastructure and a specific private key of the public-key infrastructure are loaded onto the electronic unit, in particular offline, when producing the electronic unit and/or when configuring the electronic unit, and/or that a further specific public key of the public-key infrastructure and a further specific private key of the public-key infrastructure are loaded onto the at least one component, in particular offline, when producing the at least one component and/or when configuring the at least one component. Particularly reliable copy protection which does not require any online access, in particular, can be advantageously achieved as a result. In particular, the respective specific public keys and private keys associated with an electronic unit or a component form matching key pairs.

Particularly reliable copy protection can be advantageously achieved if the public key(s) is/are stored in write-once memories of the electronic unit and/or of the at least one component. In particular, the public key(s) is/are stored in nonvolatile read-only memories (ROM) of the electronic unit and/or of the at least one component. The nonvolatile read-only memory of the electronic unit and/or of the at least one component may be, for example, a mask ROM which can be written to at the time of production, a one-time programmable "programmable read-only memory" (PROM) or a "one-time programmable erasable programmable read-only memory" (OTP-EPROM). In particular, the write-once memory is part of a microcontroller (µC), an application-specific integrated circuit (ASIC) or a field programmable gate array (FPGA).

Even more reliable copy protection can be advantageously achieved if the private key(s) is/are also stored in write-once memories of the electronic unit and/or of the at least one component in a protected manner such that it/they cannot be read. In particular, the respective key pair, in particular the connected public key and private key, is stored in the same write-once memory. In particular, at least the private keys are stored and protected such that they cannot be read. In particular, the private keys are stored in the µC, the ASIC or the FPGA in an encrypted form. Increased flexibility of the copy protection, for example by temporally limiting a life of a certificate, can be advantageously enabled if the certificate(s) is/are also stored in rewritable memories, in particular such that it/they cannot be read. In particular, the certificate(s) is/are stored in programmable and/or rewritable nonvolatile read-only memories (for example EPROM or EEPROM) of the electronic unit and/or of the at least one component. In particular, the programmable and/or rewritable memory is part of the µC, the ASIC or the FPGA. In particular, the certificates are each stored in the µC, the ASIC or the FPGA in an encrypted form. In particular, at least the certificates are each stored and protected such that they cannot be read.

It is additionally proposed that at least one additional encrypted data element, in particular an encrypted data element that differs from a random number and/or from the public keys, the private keys and the certificates, is transmitted back and forth at least once between the electronic unit and the component by means of the public-key infrastructure. This advantageously makes it possible to further increase copy protection. In particular, the additional encrypted data element is transmitted in a packet together with a cryptographic random number and/or a public key.

It is advantageously proposed that the encrypted data element is a time stamp. This advantageously makes it possible to obtain an easily determinable unique additional characteristic variable for the copy protection method. A value of a time stamp (just like a large random number, for example a 128-bit random number) is advantageously virtually impossible to guess.

It is also proposed that a list of identifiers of components and/or component groups compatible with the electronic unit is loaded onto the electronic unit when producing the electronic unit and/or when configuring the electronic unit. A further copy protection feature can be advantageously obtained as a result. A later matching of an identifier of a component with the identifiers from the list of identifiers can be advantageously carried out by the electronic unit as a result.

This advantageously makes it possible to ensure that only compatible and/or permitted components are installed and/or used in an electronic system. An identifier from the list of identifiers may be assigned, for example, to a specific component type (for example a particular design of a sensor or of a valve, etc.). Alternatively or additionally, an identifier from the list of identifiers may be assigned to a component group comprising a plurality of different component types which can be combined in a common group (for example a group of "three-way valves" or "distance sensors", etc.).

If an identifier from the list of identifiers is then assigned, in particular permanently, when producing the at least one component and/or when configuring the at least one component and is stored in a memory of the at least one component, the component can be advantageously identified by the electronic unit using the list of identifiers. This advantageously makes it possible to ensure that only compatible and/or permitted components are installed and/or used in an electronic system. A further copy protection feature can also be advantageously created. In particular, the identifier is transmitted in a packet together with the time stamp and/or the cryptographic random number.

It is also proposed that the electronic unit is embodied as an electronic control device, in particular as an "electronic control unit" (ECU) or as a "programmable logic controller" (PLC). Good copy protection for an electronic system, in particular for an embedded system, can be advantageously enabled thereby. Alternatively or additionally, it is conceivable for the electronic unit to be implemented as a computer system, in particular having a loaded operating system. The computer system may be, for example, a mobile computer system such as a smartphone, a smartwatch, a tablet, a laptop or the like. The computer system may be, for example, a permanently installed computer system such as a computer server, a desktop PC or the like.

It is also proposed that the at least one component has at least one application-specific integrated circuit (ASIC), at least one field programmable gate array (FPGA) and/or at least one microcontroller (µC). This advantageously makes it possible to achieve good copy protection for an electronic system having at least one component which interacts with the electronic unit. The component may be, for example, implemented as a solenoid valve or a solenoid actuator of a valve system which can be controlled by a central control device. The component may be, for example, embodied as an electric motor of a system which can be controlled by a central control device. The component may be, for example, embodied as a sensor of a measurement device which can be controlled by a central control device. The component may be, for example, embodied as a battery which can be controlled by a central control device such as a vehicle battery, a mobile telephone battery, a laptop battery, etc. The component may be, for example, implemented as an auxiliary control device of an installation organized and/or controlled by a central control device, such as a production installation, etc. The component may be, for example, implemented as a charging cable of a device supplied with electrical energy by an energy store (for example mobile telephone, laptop, etc.). The component may be, for example, implemented as an additional device and/or a peripheral device such as earphones, an input device, a camera, a loudspeaker, a modem, etc. of a central device such as a computer system or the like. The component may be, for example, implemented as an electrical and/or electronic device in a vehicle (for example radio, navigation system, engine control device, braking control device, etc.) which can be controlled by a central control device of the vehicle.

It is additionally proposed that the at least one component differs from a USB (Universal Serial Bus) data cable, differs from a USB charging cable and/or differs from a further device equipped with a universal serial bus. This advantageously makes it possible to also enable copy protection for devices which are not connected to one another via a USB interface.

It is also proposed that the copy protection method, in a further aspect of the invention which can be considered alone or in combination with at least one, in particular in combination with one, in particular in combination with any desired number, of the other aspects of the invention, has at least one first method part having the following method steps:
  setting up a data connection between the electronic unit and the at least one component,
  transmitting the first certificate from the electronic unit to the at least one component, wherein the first certificate preferably comprises the public key of the electronic unit,
  verifying the first certificate by means of the at least one component, in particular by means of a public key of the certification authority, wherein the public key of the electronic unit is determined, in particular,
  locally storing the public key of the electronic unit by means of the at least one component, in particular permanently storing the public key of the electronic unit in a ROM of the at least one component or temporarily storing the public key of the electronic unit in a RAM of the at least one component, after successful verification of the first certificate, in particular in at least one data memory of the at least one component,
  transmitting the second certificate from the at least one component to the electronic unit, wherein the second certificate preferably comprises the further public key of the at least one component,
  verifying the second certificate by means of the electronic unit, in particular by means of a public key of the certification authority, wherein the further public key of the at least one component is determined, in particular, and
  locally storing the further public key of the at least one component by means of the electronic unit, in particular permanently storing the further public key of the at least one component in a ROM of the electronic unit or temporarily storing the further public key of the at least one component in a RAM of the electronic unit, after successful verification of the second certificate, in particular in at least one data memory of the electronic unit, and at least one second method part having the following method steps:
  generating a random number, in particular a cryptographically secure random number, preferably at least a 128-bit random number, by means of the electronic unit, in particular by means of a cryptographically secure random number generator of the electronic unit,
  generating a time stamp, in particular a qualified time stamp, by means of the electronic unit,
  locally and/or temporarily storing the random number, in particular the cryptographically secure random number, and the time stamp by means of the electronic unit, in particular in at least one data memory of the electronic unit, encrypting a packet, which comprises at least the random number, in particular the cryptographically secure random number, and at least one time stamp, in particular the time stamp, by means of the further public key of the at least one component that is stored by the electronic unit, transmitting the encrypted packet from the electronic unit to the at least one component, decrypting the packet by means of the at least one component by means of the private key of the at least one component, adding the specific identifier assigned to the at least one component to the packet, encrypting the packet which has been expanded by the specific identifier assigned to the at least one component by means of the public key of the electronic unit that is stored by the at least one component, transmitting the expanded packet from the at least one component to the electronic unit, decrypting the expanded packet by means of the electronic unit by means of the private key of the electronic unit, comparing the time stamp from the decrypted expanded packet with the time stamp that is locally and/or temporarily stored in the electronic unit, comparing the random number, in particular the cryptographically secure random number, from the decrypted expanded packet with the random number, in particular the cryptographically secure random number, locally and/or temporarily stored in the electronic unit, and matching the specific identifier from the decrypted expanded packet with identifiers from the list of identifiers which is stored in the electronic unit, in particular in a data memory of the electronic unit, and wherein authenticity of the at least one component is confirmed by the electronic unit if the following three criteria are satisfied:

a) correspondence of the random numbers, in particular the cryptographically secure random numbers,
b) correspondence of the time stamps,
c) correspondence of the specific identifier to at least one identifier from the list of identifiers, or wherein, in the event of a discrepancy of the random numbers, in particular the cryptographically secure random numbers, in the event of a discrepancy of the time stamps or if the specific identifier transmitted to the electronic unit is absent in the list of identifiers stored by the electronic unit, a forgery and/or an incompatible component are/is identified by the electronic unit. In particular, the method steps of the first method part and/or of the second method part may also have, according to the invention, sequences of method steps differing from the above order. This advantageously makes it possible to achieve a high degree of operational reliability of electronic systems, in particular of electronic systems without a data connection to a certification authority and/or without an Internet connection. This advantageously makes it possible to check the authenticity of components of the electronic system offline. "Temporarily storing" should be understood as meaning, in particular, storage for a limited period, for example several minutes, hours or days. A temporarily stored data record is preferably deleted after completion of performance, in particular one-off performance, of the copy protection method or after the electronic system has been stopped.

It is also proposed that, when a forgery and/or an incompatible component are/is identified by the electronic unit, use of the forgery and/or use of the incompatible component within the electronic system is denied. This advantageously makes it possible to prevent the electronic system from being impaired and/or damaged, for example by unauthorized counterfeit products. Guarantee protection can be advantageously achieved thereby, in particular since (even unconscious) use of counterfeit products and/or unauthorized structural parts generally results in expiry of a guarantee for an electronic system. In particular, the electronic unit, in particular the control device, stops operation of the entire electronic system or of a part of the electronic system, in particular of at least that part of the electronic system which comprises the forgery and/or the incompatible component. In particular, the electronic unit, in particular the control device, denies resumption of operation of the electronic system or of a part of the electronic system, in particular at least of that part of the electronic system which comprises the forgery and/or the incompatible component, after installation of the forgery and/or the incompatible component has been detected.

It is also proposed that the first method part and the second method part are carried out and/or repeated each time a component of the electronic system that interacts with the electronic unit is replaced and/or each time a component interacting with the electronic unit is newly installed. This advantageously makes it possible to ensure that authenticity of replaced and/or newly installed components, for example spare parts, wear parts or consumable parts, of electronic systems is checked effectively and/or safely. The two method parts of the copy protection method are preferably carried out or repeated together only after a component of the electronic system that interacts with the electronic unit has been replaced and/or newly installed.

It is also proposed that the second method part is carried out and/or repeated each time the electronic system is started. This advantageously makes it possible to ensure reliable copy protection. Alternatively or additionally, it is conceivable for the second method part to be carried out and/or repeated at predefined, in particular regular or irregular, intervals of time. Optionally, both method parts can be carried out and/or repeated each time the electronic system is started. It is also conceivable for the two method parts to be carried out and/or repeated at predefined, in particular regular or irregular, intervals of time.

The electronic unit, in particular the electronic control unit for the electronic system, having pre-installed software and/or programming provided at least for the purpose of carrying out the copy protection method described is also proposed. Alternatively, a system comprising the electronic unit and the hardware element is proposed, wherein the hardware element is inserted into the electronic unit and has the pre-installed software and/or programming provided at least for the purpose of carrying out the copy protection method. In particular, the hardware element comprises at least one electronic circuit. The hardware element preferably comprises at least one memory (RAM and/or ROM) and at least one processor. The component of the electronic system, having pre-installed software and/or programming provided at least for the purpose of carrying out the copy protection method described, is also proposed. The electronic system having the electronic unit and one or more components is also proposed.

A copy-protected electronic system having the electronic unit and having the at least one component which interacts with the electronic unit is also proposed, wherein the electronic unit is provided for the purpose of checking authenticity at least of the at least one component by mutually checking certificates of a public-key infrastructure which are respectively associated with the electronic unit and the at least one component, wherein the electronic unit has a premade first certificate which is already loaded, in particular offline, when producing the electronic unit and/or when configuring the electronic unit, and/or wherein the at least one component has a premade second certificate which is already loaded, in particular offline, when producing the at least one component and/or when configuring the at least one component. This advantageously makes it possible to achieve a high degree of operational reliability of electronic systems, in particular of electronic systems without a data connection to a certification authority and/or without an Internet connection. This advantageously makes it possible to check the authenticity of components of the electronic system offline. In particular, the premade certificates may already be stored on the electronic unit and/or the at least one component in the delivery state. Alternatively, it is conceivable for the premade certificate of the electronic unit to be loaded onto an electronic unit, which has already been delivered and/or is already in use, together with a software patch of the electronic unit. Alternatively, it is also conceivable for the premade certificate of the electronic unit to be pre-installed on the hardware element which is installed on an electronic unit which has already been delivered and/or is already in use.

It is additionally proposed that the electronic unit has a specific public key of the public-key infrastructure which is already loaded, in particular offline, when producing the electronic unit and/or when configuring the electronic unit, and has a specific private key of the public-key infrastructure which is already loaded, in particular offline, when producing the electronic unit and/or when configuring the electronic unit, and/or that the at least one component has a further specific public key of the public-key infrastructure that is loaded, in particular offline, when producing the at least one component and/or when configuring the at least one component, and has a further specific private key of the public-key infrastructure that is already loaded, in particular offline, when producing the at least one component and/or when configuring the at least one component. This advantageously makes it possible to achieve particularly reliable copy protection.

If the copy-protected electronic system has offline checkability of the authenticity of the at least one component, a high degree of versatility of the copy-protected electronic system, which is, in particular, independent from a connection of the copy-protected electronic system to the Internet, can be advantageously achieved. In addition, particularly reliable copy protection, in particular copy protection which is particularly difficult to crack and/or particularly difficult to overcome, can be advantageously achieved as a result.

The copy protection method according to the invention and the copy-protected electronic system according to the invention are not intended to be restricted in this case to the application and embodiment described above. In particular, in order to perform a method of operation described herein, the copy protection method according to the invention and the copy-protected electronic system according to the invention may have a number of individual elements, structural parts and units differing from a number mentioned herein.

DRAWINGS

Further advantages emerge from the following description of the drawings. The drawings illustrate four exemplary embodiments of the invention. The drawings, the description and the claims contain numerous features in combination. A person skilled in the art will also expediently consider the features individually and will combine them to form further useful combinations.

Figure 2:
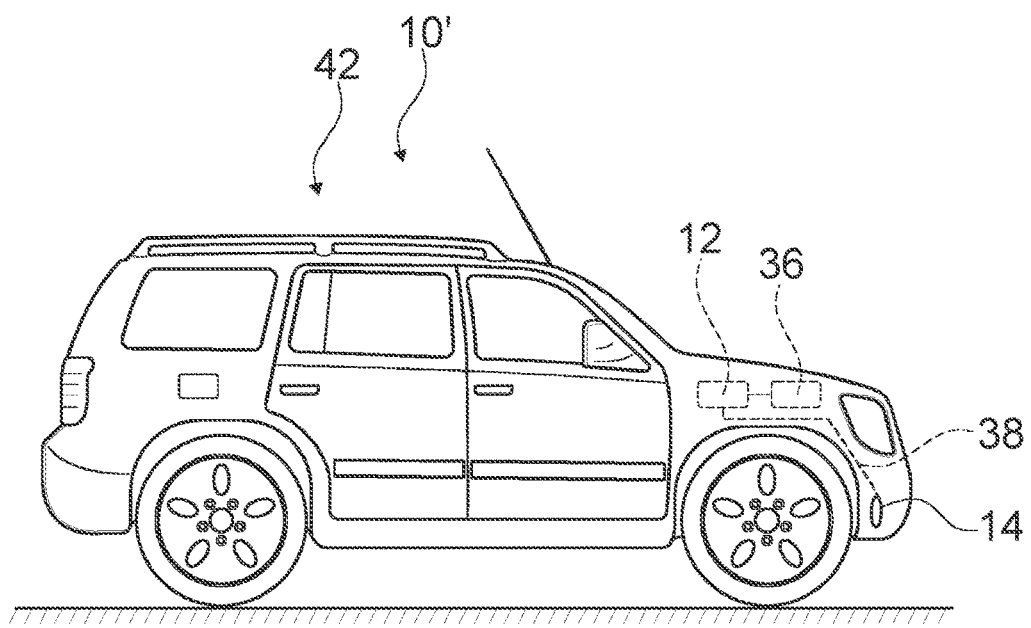
Figure 3:
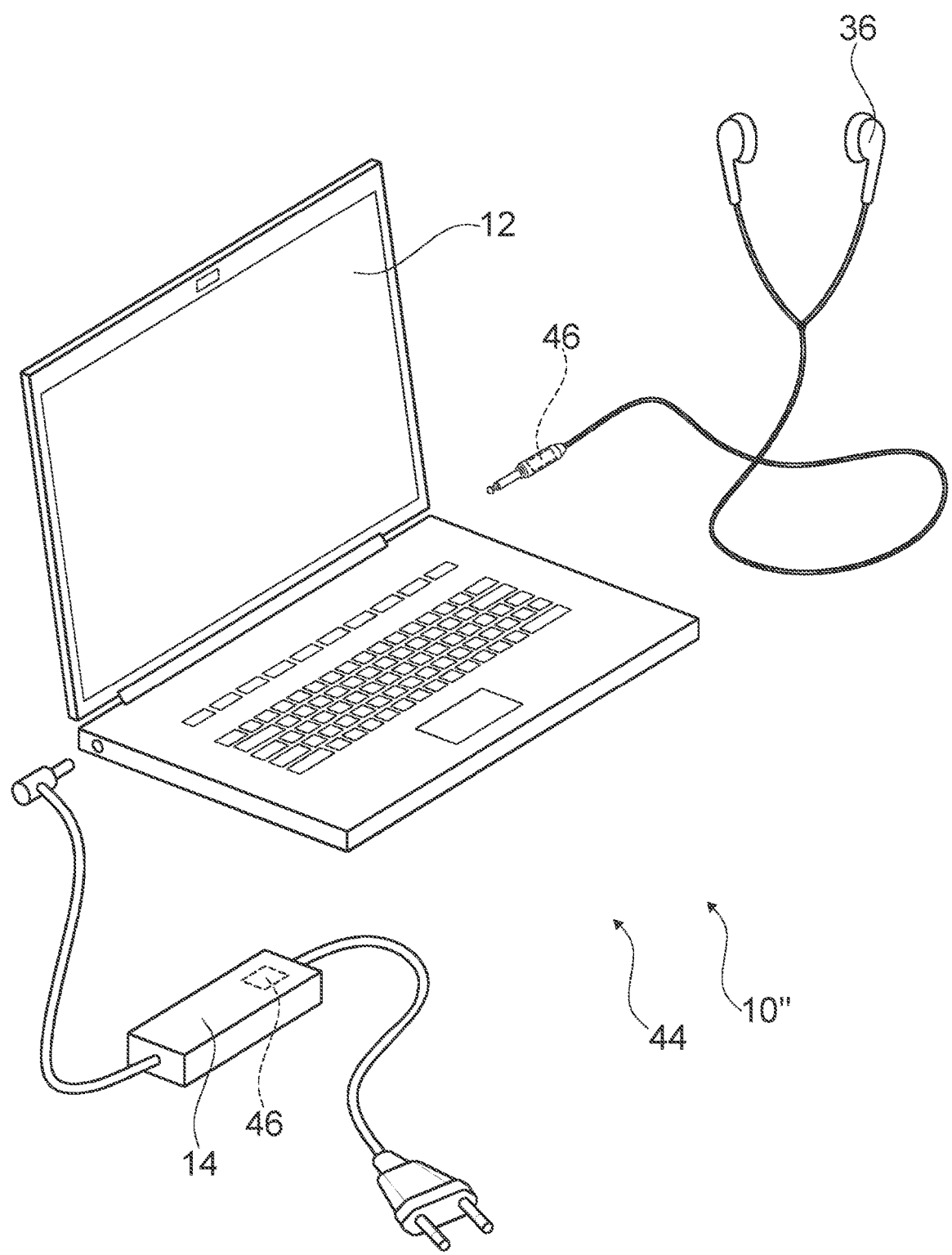
Figure 4:
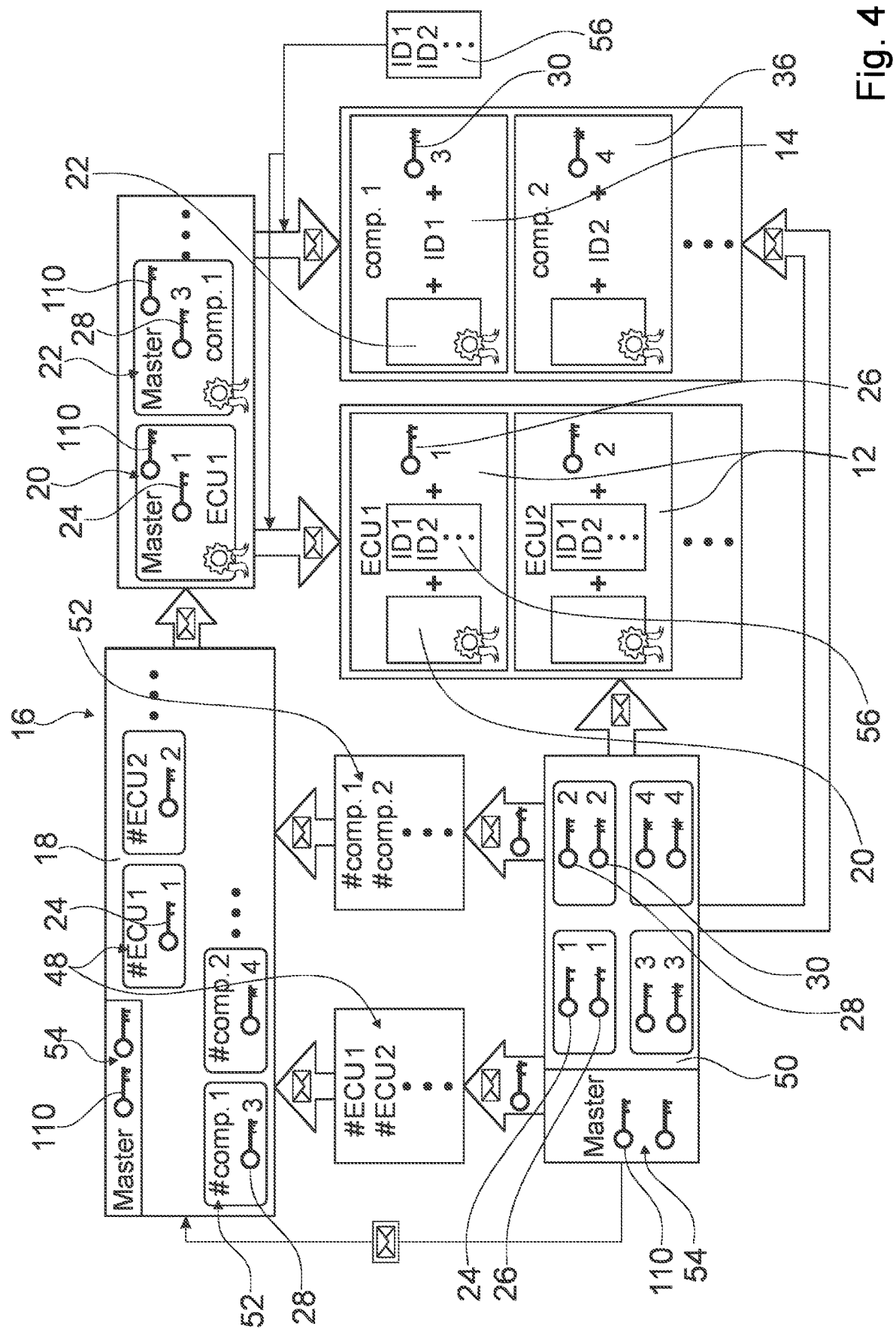
Figure 5:
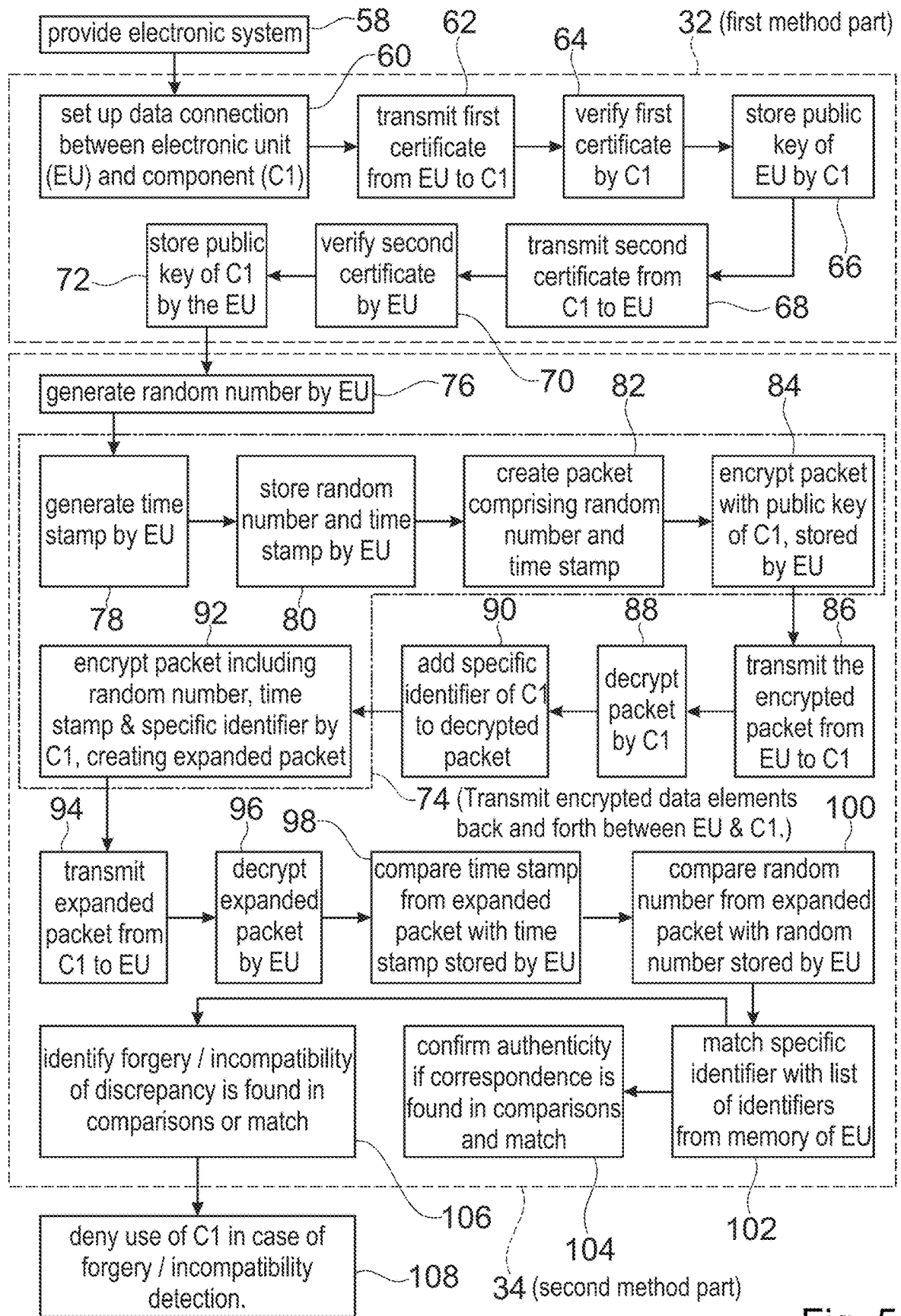
Figure 6:
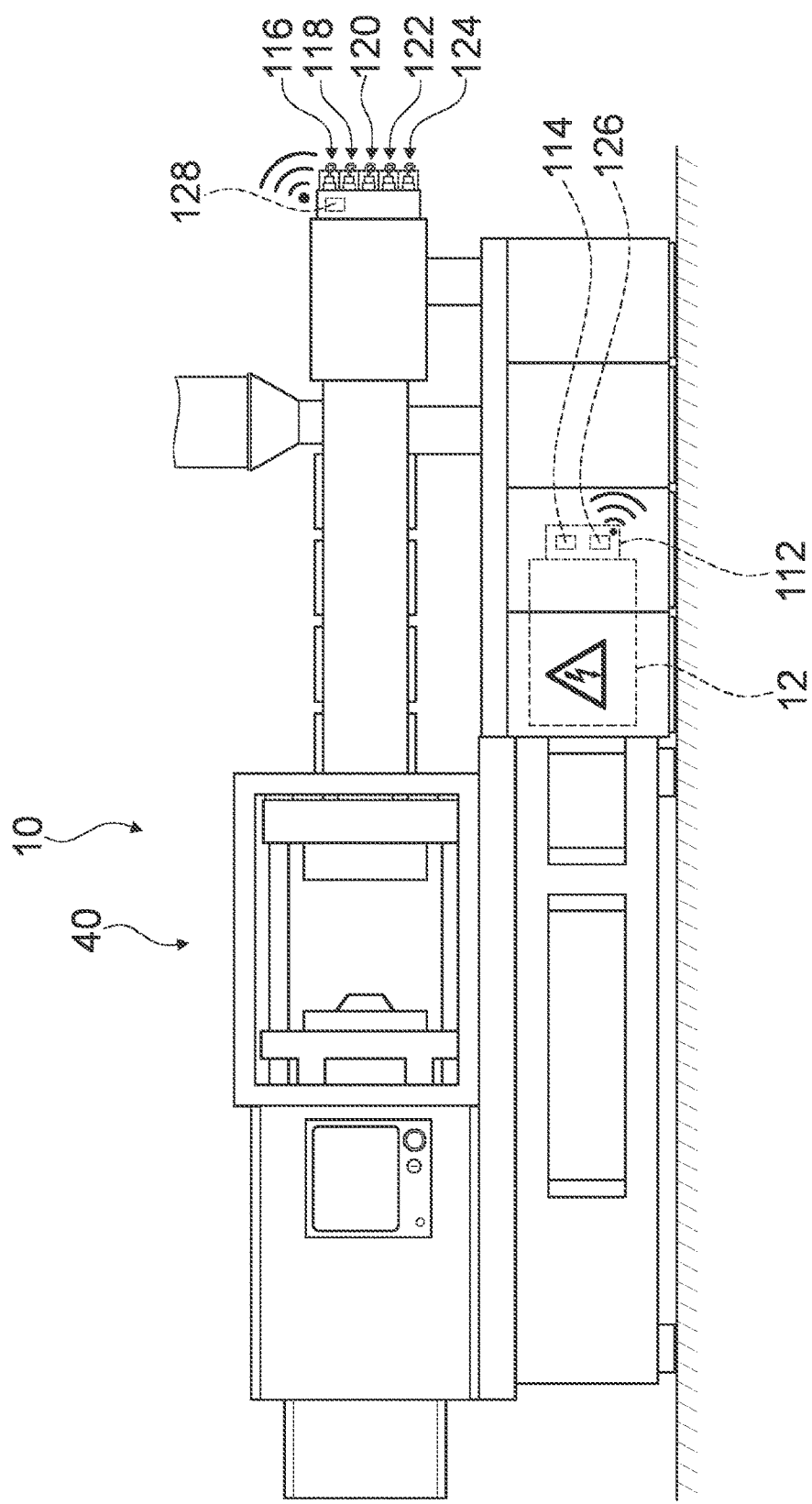

In the drawings:

FIG. 1 shows a schematic illustration of an electronic system which is implemented as an injection molding machine, for example, is protected by means of a copy protection method and has an electronic unit and components, FIG. 2 shows a schematic illustration of an alternative electronic system which is implemented as a vehicle, for example, and is protected by means of the copy protection method, FIG. 3 shows a schematic illustration of a second alternative electronic system which is implemented as a computer system, for example, and is protected by means of the copy protection method, FIG. 4 shows a schematic illustration of a public-key infrastructure of the copy protection method, FIG. 5 shows an exemplary schematic flowchart of the copy protection method, and FIG. 6 shows a further schematic illustration of the electronic system which is implemented as the injection molding machine and has an electronic unit having a hardware element.

DESCRIPTION OF THE EXEMPLARY EMBODIMENTS

FIG. 1 shows an electronic system 10 which is implemented as an injection molding machine 40, for example. The electronic system 10 as an electronic unit 12 embodied as a central controller and/or an electronic control device. The electronic system 10 has components 14, 36. One component 14 of the components 14, 36 of the electronic system 10 implemented as an injection molding machine 40 is implemented as a valve. The component 14 that is implemented as a valve is provided for the purpose of controlling a flow through a shut-off nozzle (not shown in detail) of the injection molding machine 40. A further component 36 of the components 14, 36 of the electronic system 10 that is implemented as an injection molding machine 40 is embodied as an electric motor (not shown in detail). The component 36 that is embodied as an electric motor is provided for the purpose of controlling a rotational movement of a worm shaft of the injection molding machine 40. The components 14, 36 comprise an ASIC, an FPGA and/or a µC. The components 14, 36 interact with the electronic unit 12. The components 14, 36 are connected to the electronic unit 12 via a data line 38. Alternatively, a radio connection is also conceivable (cf. also FIG. 6). The electronic unit 12 is provided for the purpose of controlling the functions of the components 14, 36, for example for the purpose of controlling the open position of the valve or the rotational movement of the worm shaft. The electronic unit 12 of the electronic system 10 forms an ECU or a PLC.

FIG. 2 shows an alternative electronic system 10' which is implemented as a vehicle 42, for example, in particular implemented as a vehicle driving in an at least partially autonomous manner. The alternative electronic system 10' has an electronic unit 12 that is embodied as a central controller and/or an electronic control device. The alternative electronic system 10' has components 14, 36. One component 14 of the components 14, 36 of the alternative electronic system 10' that is implemented as a vehicle 42 is embodied as a distance sensor (for example a radar sensor or a lidar sensor) of the vehicle 42. The component 14 that is embodied as a distance sensor is provided for the purpose of topographically identifying an environment of the vehicle 42. A further component 36 of the components 14, 36 of the alternative electronic system 10' that is implemented as a vehicle 42 is embodied as an electric motor (not shown in detail). The component 36 that is embodied as an electric motor is provided for the purpose of controlling a part of the vehicle 42, for example a steering system or a speed of the vehicle 42. The components 14, 36 interact with the electronic unit 12. The components 14, 36 comprise an ASIC, an FPGA and/or a µC. The components 14, 36 are connected to the electronic unit 12 via a data line 38. Alternatively, a radio connection is also conceivable (cf. FIG. 6). The electronic unit 12 is provided for the purpose of controlling the functions of the components 14, 36. The electronic unit 12 of the alternative electronic system 10' forms an ECU or a PLC.

FIG. 3 shows a second alternative electronic system 10" which is implemented as a computer system 44, for example, in particular implemented as a portable computer system. The second alternative electronic system 10" has an electronic unit 12 that is embodied as a portable computer, in particular a laptop. The electronic unit 12 of the second alternative electronic system 10" is embodied as a central electronic unit of the second alternative electronic system 10". The second alternative electronic system 10" has components 14, 36. One component 14 of the components 14, 36 of the second alternative electronic system 10" that is implemented as a computer system 44 is realized as a charging cable of the portable computer. The component 14 that is realized as a charging cable is provided for the purpose of supplying an energy store of the portable computer with electrical charging energy. A further component 36 of the components 14, 36 of the second alternative electronic system 10" that is implemented as a computer system 44 is realized as earphones. The component 36 realized as earphones is provided for the purpose of outputting acoustic signals generated by the portable computer. The components 14, 36 interact with the electronic unit 12. The components 14, 36 are connected to the electronic unit 12 via a cable connection. The components 14, 36 each have an integrated cryptographic module 46. The cryptographic module 46 is provided for the purpose of transmitting encrypted data to the electronic unit 12 or receiving encrypted data from the electronic unit 12. The components 14, 36, in particular the cryptographic modules 46 of the components 14, 36, are connected to the electronic unit 12 via a data line 38. Alternatively, a radio connection is also conceivable. The cryptographic module 46 of the components 14, 36 comprises an ASIC, an FPGA and/or a µC.

The electronic units 12 of the electronic systems 10, 10', 10" are superordinate to the components 14, 36 of the electronic systems 10, 10', 10". The electronic units 12 of the electronic systems 10, 10', 10" each have pre-installed software and/or programming provided at least for the purpose of carrying out a copy protection method (described herein). Alternatively, a software patch can be loaded onto the electronic units 12 of the electronic systems 10, 10', 10", which software patch is provided for the purpose of making it possible to carry out the copy protection method described herein. Alternatively, a hardware element 112 (see FIG. 6) can be installed on the electronic unit 12 of the electronic systems 10, 10', 10", which hardware element has software or programming provided for the purpose of making it possible to carry out the copy protection method described herein. The components 14, 36 of the electronic systems 10, 10', 10" are subordinate to the electronic units 12 of the electronic systems 10, 10', 10". The components 14, 36 of the electronic systems 10, 10', 10" have pre-installed software and/or programming provided at least for the purpose of carrying out the copy protection method (described herein).

The electronic unit 12 is provided for the purpose of checking authenticity of the components 14, 36. The electronic unit 12 is provided for the purpose of checking the authenticity of the components 14, 36 by mutually checking certificates 20, 22 of a public-key infrastructure 16 which are respectively associated with the electronic unit 12 and the components 14, 36 (cf. FIG. 4).

The electronic systems 10, 10', 10" form copy-protected electronic systems 10, 10', 10". The copy-protected electronic systems 10; 10'; 10" make it possible to check the authenticity of the respectively associated components 14, 36 offline.

For this purpose, the electronic units 12 of the electronic systems 10, 10', 10" have the first certificate 20 which is already loaded when producing the electronic unit 12 and/or when configuring the electronic units 12. The first certificate 20 has been premade offline before being loaded onto the electronic unit 12. The electronic units 12 of the electronic systems 10, 10', 10" also have a specific public key 24 of the public-key infrastructure 16 which is already loaded when producing the electronic units 12 and/or when configuring the electronic units 12. The electronic units 12 of the electronic systems 10, 10', 10" also have a specific private key 26 of the public-key infrastructure 16 which is already loaded when producing the electronic units 12 and/or when configuring the electronic units 12. The specific public key 24 of one of the electronic units 12 and the specific private key 26 of the same electronic unit 12 form a unique key pair.

For this purpose, the components 14, 36 of the electronic systems 10, 10', 10" also have the second certificate 22 which is already loaded when producing the components 14, 36 and/or when configuring the components 14, 36. The second certificate 22 has been premade offline before being loaded onto the components 14, 36. The components 14, 36 of the electronic systems 10, 10', 10" also each have a further specific public key 28 of the public-key infrastructure 16 which is loaded when producing the components 14, 36 and/or when configuring the components 14, 36. The components 14, 36 of the electronic systems 10, 10', 10" also have a further specific private key 30 of the public-key infrastructure 16 which is already loaded when producing the components 14, 36 and/or when configuring the components 14, 36.

FIG. 4 shows a schematic illustration of a public-key infrastructure 16 of the copy protection method. The copy protection method has offline capability. In the copy protection method, in order to check authenticity of components 14, 36 of the electronic system 10 by means of the electronic unit 12 of the electronic system 10, the certificates 20, 22 respectively associated with the components 14, 36 and the electronic unit 12 are mutually checked within the electronic system 10. The public-key infrastructure 16 has a cryptographic generator 50. The cryptographic generator 50 is provided for the purpose of creating associated key pairs of public keys 24, 28 and private keys 26, 30. The cryptographic generator 50 itself is protected by means of a master key pair 54. The key pairs created by the cryptographic generator 50 are transmitted to a manufacturer of components 14, 36 and/or to a manufacturer of electronic units 12. The key pairs are transmitted on a secure path which cannot be intercepted or at least can be intercepted with difficulty, preferably on a transmission path which is independent from electronic data connections of the electronic unit 12, for example via a physical data storage medium. Each electronic unit 12 has a unique identification feature 48, for example a serial number of the electronic unit 12. Each component 14, 36 has a unique identification feature 52, for example a serial number of the component 14, 36.

The public-key infrastructure 16 has a certification authority 18. The cryptographic generator 50 may be formed separately from the certification authority 18 together with the certification authority 18. The certification authority 18 is provided for the purpose of issuing the first certificate 20 for the electronic unit 12. The certification authority 18 is provided for the purpose of issuing the second certificate 22 for the respective components 14, 36. The manufacturer of the component 14, 36 and/or of the electronic unit 12 assigns a key pair to each component 14, 36 and/or to each electronic unit 12. The manufacturer of the component 14, 36 and/or of the electronic unit 12 respectively transmits the public key 24, 28 of the assigned key pairs, together with the respectively associated assigned identification features 48, 52, in a manner packaged in packets, to the certification authority 18 via a secure transmission path which is independent from electronic data connections of the electronic unit 12 and/or of the components 14, 36. Alternatively, it is conceivable for the manufacturer to transmit the identification features 48, 52 to the cryptographic generator 50 which assigns a key pair to each identification feature 48, 52 associated with a component 14, 36 or with an electronic unit 12 and forwards the public keys 24, 28 of the assigned key pairs, together with the respectively associated assigned identification features 48, 52, in a manner packaged in packets, to the certification authority 18 via a secure transmission path which is independent from electronic data connections of the electronic unit 12 and/or of the components 14, 36.

The first certificate 20 is then respectively issued on the basis of the transmitted identification feature 48 of the electronic unit 12 and the associated public key 24, 28 of the electronic unit 12. The second certificate 22 is then respectively issued on the basis of the transmitted identification feature 52 of the components 14, 36 and the associated public key 24, 28 of the components 14, 36. The first certificate 20 is premade. The first certificate 20 is premade offline. The second certificate 22 is premade. The second certificate 22 is premade offline. The premade certificates 20, 22 are returned from the certification authority 18 to the respective manufacturer of the electronic unit 12 and/or of the component 14, 36 via a secure transmission path which is independent from electronic data connections of the electronic unit 12 and/or of the components 14, 36.

When producing the electronic unit 12, the first certificate 20 associated with the electronic unit 12 is loaded onto the electronic unit 12 (offline). Alternatively or additionally, the first certificate 20 associated with the electronic unit 12 is loaded onto the electronic unit 12 when configuring the electronic unit 12 (offline). The first certificate 20 associated with the electronic unit 12 is stored in a rewritable memory of the electronic unit 12. When producing the component 14, 36, the second certificate 22 associated with the component 14, 36 is loaded onto the component 14, 36 (offline). Alternatively or additionally, the second certificate 22 associated with the component 14, 36 is loaded onto the component 14, 36 when configuring the component 14, 36 (offline). The second certificate 22 associated with the component 14, 36 is stored in a rewritable memory of the component 14, 36.

When producing the electronic unit 12, the specific public key 24 of the public-key infrastructure 16 that is associated with the electronic unit 12 is loaded onto the electronic unit 12 (offline). Alternatively or additionally, the specific public key 24 of the public-key infrastructure 16 that is associated with the electronic unit 12 is loaded onto the electronic unit 12 when configuring the electronic unit 12 (offline). The public key 24 assigned to the electronic unit 12 is stored in a write-once memory of the electronic unit 12. When producing the electronic unit 12, the specific private key 26 of the public-key infrastructure 16 that is associated with the electronic unit 12 is loaded onto the electronic unit 12 (offline). Alternatively or additionally, the specific private key 26 of the public-key infrastructure 16 that is associated with the electronic unit 12 is loaded onto the electronic unit 12 when configuring the electronic unit 12 (offline). The private key 26 assigned to the electronic unit 12 is stored in a write-once memory of the electronic unit 12 such that it cannot be read (in an encrypted form).

The manufacturer of the electronic unit 12 or the operator of the certification authority 18 creates a list of identifiers 56 of components 14, 36 that are compatible with the electronic unit 12 and/or of component groups that are compatible with the electronic unit 12. When producing the electronic unit 12, the list of identifiers 56 of components 14, 36 and/or component groups that are compatible with the electronic unit 12 is loaded onto the electronic unit 12 (offline). Alternatively or additionally, the list of identifiers 56 of components 14, 36 and/or component groups that are compatible with the electronic unit 12 is loaded onto the electronic unit 12 when configuring the electronic unit 12 (offline). The list of identifiers 56 of components 14, 36 and/or component groups that are compatible with the electronic unit 12 is stored in the write-once memory of the electronic unit 12 or in a rewritable memory of the electronic unit 12. It is conceivable for the list of identifiers 56 of components 14, 36 and/or component groups that are compatible with the electronic unit 12 to be stored in the memory of the electronic unit 12 such that it cannot be read (in an encrypted form).

When producing the component 14, 36, the specific public key 28 of the public-key infrastructure 16 that is associated with the component 14, 36 is loaded onto the component 14, 36 (offline). Alternatively or additionally, the specific public key 28 of the public-key infrastructure 16 that is associated with the component 14, 36 is loaded onto the component 14, 36 when configuring the component 14, 36 (offline). The public key 28 assigned to the component 14, 36 is stored in a write-once memory of the component 14, 36. When producing the component 14, 36, the specific private key 30 of the public-key infrastructure 16 that is associated with the component 14, 36 is loaded onto the component 14, 36 (offline). Alternatively or additionally, the specific private key 30 of the public-key infrastructure 16 that is associated with the component 14, 36 is loaded onto the component 14, 36 when configuring the component 14, 36 (offline). The private key 30 assigned to the component 14, 36 is stored in a write-once memory of the component 14, 36 such that it cannot be read (in an encrypted form).

The manufacturer of the components 14, 36 or the operator of the certification authority 18 assigns an identifier from the list of identifiers 56 to each component 14, 36. When producing the component 14, 36, one of the identifiers from the list of identifiers 56 is loaded onto the component 14, 36 (offline). When producing the component 14, 36, one of the identifiers from the list of identifiers 56 is stored in a memory of the component 14, 36 (offline). Alternatively or additionally, one of the identifiers from the list of identifiers 56 is loaded onto the component 14, 36 when configuring the component 14, 36 (offline) and/or is stored in the memory of the component 14, 36. The identifier assigned to the component 14, 36 is stored in a write-once memory of the component 14, 36 or in a rewritable memory of the component 14, 36. It is conceivable for the identifier assigned to the component 14, 36 to be stored in the memory of the component 14, 36 such that it cannot be read (in an encrypted form).

FIG. 5 shows an exemplary schematic flowchart of the copy protection method. In at least one method step 58, an electronic system 10, 10', 10" having the electronic unit 12 and having at least one component 14, 36 that interacts with the electronic unit 12 is provided. The copy protection method comprises a first method part 32. The copy protection method comprises a second method part 34. The first method part 32 and the second method part 34 are carried out and/or repeated in succession each time a component 14, 36 of the electronic system 10; 10'; 10" that interacts with the electronic unit 12 is replaced and/or each time a component 14, 36 that interacts with the electronic unit 12 is newly installed. During a normal start of the electronic system 10, 10', 10", which was not preceded by any replacement of a component 14, 36 and/or any reinstallation of a component 14, 36 in particular, only the second method part 34 is carried out and/or repeated. The first method part 32 is skipped during the normal start of the electronic system 10, 10', 10". Alternatively, however, a situation is also conceivable in which no permanent storage of the certificates 20, 22, which have been replaced in the first method part 32, is provided for the electronic unit 12 and/or for the component 14, 36. Instead, temporary storage, use and subsequent deletion could be provided in this case. In this case, the first method part 32 is then carried out again each time the electrical system 10, 10', 10" is started, in particular even during the normal start of the electrical system 10, 10', 10".

The first method part 32 comprises a plurality of method steps 60, 62, 64, 66, 68, 70, 72. The method steps 60, 62, 64, 66, 68, 70, 72 of the first method part 32 may also have a sequence of method steps which differs from the sequence of method steps described below. In at least one method step 60 of the first method part 32, a data connection is set up between the electronic unit 12 and the component 14, 36. In at least one further method step 62 of the first method part 32, the first certificate 20 is transmitted from the electronic unit 12 to the component 14, 36. The first certificate 20 transmitted in the method step 62 comprises the public key 24 of the electronic unit 12. In at least one further method step 64 of the first method part 32, the first certificate 20 is verified by the component 14, 36. In the method step 64, the first certificate 20 is verified by means of a public key 110 of the certification authority 18. In the method step 64, the public key 24 of the electronic unit 12 is determined by the component 14, 36. In at least one further method step 66 of the first method part 32, the public key 24 of the electronic unit 12 is locally stored by the component 14, 36 in the memory of the component 14, 36, in particular in a ROM (permanent) of the component 14, 36 or in a RAM (temporary) of the component 14, 36, after the first certificate 20 has been successfully verified by the component 14, 36. In at least one further method step 68 of the first method part 32, the second certificate 22 is transmitted from the component 14, 36 to the electronic unit 12. The second certificate 22 transmitted in the method step 68 comprises the further public key 28 of the component 14, 36. In at least one further method step 70 of the first method part 32, the second certificate 22 is verified by the electronic unit 12. In the method step 70, the second certificate 22 is verified by means of the public key 110 of the certification authority 18. In the method step 70, the further public key 28 of the component 14, 36 is determined by the electronic unit 12. In at least one further method step 72 of the first method part 32, the further public key 28 of the component 14, 36 is locally stored by the electronic unit 12 in the memory of the electronic unit 12, in particular in a ROM (permanent) of the electronic unit 12 or in a RAM (temporary) of the electronic unit 12, after the second certificate 22 has been successfully verified by the electronic unit 12.

The second method part 34 comprises a plurality of method steps 74, 76, 78, 80, 82, 84, 86, 88, 90, 92, 94, 96, 98, 100, 102, 104, 106. The method steps 74, 76, 78, 80, 82, 84, 86, 88, 90, 92, 94, 96, 98, 100, 102, 104, 106 of the second method part 34 may also have a sequence of method steps that differs from the sequence of method steps described below. In at least one method step 74 of the second method part 34, at least one additional encrypted data element that is implemented as a time stamp and/or a cryptographically secure random number is transmitted back and forth at least once between the electronic unit 12 and the component 14, 36 by means of the public-key infrastructure 16. The electronic unit 12 has a cryptographically secure random number generator (not shown). In at least one method step 76 of the second method part 34, a cryptographically secure random number is generated by the random number generator of the electronic unit 12. In at least one method step 78 of the second method part 34, a time stamp is generated by the electronic unit 12. In at least one further method step 80 of the second method part 34, the cryptographically secure random number and the time stamp are locally and/or temporarily stored by the electronic unit 12 in the memory of the electronic unit 12. In this context, "temporarily storing" should be understood as meaning, in particular, time-limited storage during which the temporarily stored data are preferably deleted again after successfully identifying authenticity of the component 14, 36 or are overwritten when a further cryptographically secure random number or a further time stamp is generated. In at least one further method step 82 of the second method part 34, the electronic unit 12 creates a packet comprising at least the cryptographically secure random number and the time stamp. In at least one further method step 84 of the second method part 34, the packet comprising the cryptographically secure random number and the time stamp is encrypted by means of the further public key 28 of the component 14, 36 that is stored by the electronic unit 12. In at least one further method step 86 of the second method part 34, the encrypted packet is transmitted from the electronic unit 12 to the component 14, 36. In at least one further method step 88 of the second method part 34, the packet is decrypted by the component 14, 36 by means of the further private key 30 of the component 14, 36. In at least one further method step 90 of the second method part 34, the specific identifier assigned to the component 14, 36 is added to the packet by the component 14, 36. In at least one further method step 92 of the second method part 34, the packet expanded by the specific identifier assigned to the component 14, 36 is encrypted by means of the public key 24 of the electronic unit 12 that is stored by the component 14, 36. In at least one further method step 94 of the second method part 34, the packet expanded by the specific identifier assigned to the component 14, 36 is transmitted from the component 14, 36 to the electronic unit 12. In at least one further method step 96 of the second method part 34, the packet expanded by the specific identifier assigned to the component 14, 36 is decrypted by the electronic unit 12 by means of the private key 26 of the electronic unit 12. In at least one further method step 98 of the second method part 34, the time stamp from the expanded packet received by the electronic unit 12 and decrypted by the electronic unit 12 is compared with the time stamp stored locally and/or temporarily in the memory of the electronic unit 12. In at least one further method step 100 of the second method part 34, the cryptographically secure random number from the expanded packet received by the electronic unit 12 and decrypted by the electronic unit 12 is compared with the cryptographically secure random number stored locally and/or temporarily in the memory of the electronic unit 12. In at least one further method step 102 of the second method part 34, the specific identifier from the expanded packet received by the electronic unit 12 and decrypted by the electronic unit 12 is matched with identifiers from the list of identifiers 56 stored in the memory of the electronic unit 12. In at least one further method step 104 of the second method part 34, authenticity of the component 14, 36 is confirmed by the electronic unit 12 if the following three criteria are satisfied: a) correspondence of the cryptographically secure random numbers, b) correspondence of the time stamps and c) correspondence of the specific identifier to at least one identifier from the list of identifiers 56 stored in the memory of the electronic unit 12. Alternatively, in at least one further method step 106 of the second method part 34: a) in the event of a discrepancy of the cryptographically secure random numbers, b) in the event of a discrepancy of the time stamps or c) if the specific identifier transmitted to the electronic unit 12 is absent in the list of identifiers 56 stored by the electronic unit 12, a forgery and/or an incompatible component are/is identified by the electronic unit 12.

In at least one further method step 108, if a forgery and/or an incompatible component are/is identified by the electronic unit 12 in the second method part 34, use of the forgery and/or use of the incompatible component within the electronic system 10, 10', 10" is denied.

FIG. 6 shows the electronic system 10 that is implemented as an injection molding machine 40, for example, in a further configuration. The electronic system 10 comprises further components 116, 118, 120, 122, 124. The further components 116, 118, 120, 122, 124 form, by way of example, solenoid valves of a battery of solenoid valves of the injection molding machine 40. The electronic system 10 comprises a hardware element 112. The hardware element 112 is connected to the electronic unit 12 of the electronic system 10 of the injection molding machine 40. The hardware element 112 is plugged into the electronic unit 12 by means of IO pins. The hardware element 112 comprises an electronic circuit 114 having a processor (not shown) and a data memory (not shown). The hardware element 112 comprises pre-installed software and/or programming provided at least for the purpose of carrying out the copy protection method described. The hardware element 112 is provided for the purpose of transmitting an item of information relating to authenticity of one or more components 14, 36, 116, 118, 120, 122, 124 of the electronic system 10, as determined by means of the copy protection method, to the electronic unit 12. The electronic unit 12 is provided for the purpose of allowing or preventing the operation of individual components 14, 36, 116, 118, 120, 122, 124 and/or of the entire electronic system 10 on the basis of the information received from the hardware element 112. The hardware element 112 has a radio module 126. The components 116, 118, 120, 122, 124 have a further radio module 128. The components 116, 118, 120, 122, 124 are connected to the further radio module 128. Alternatively, each component 14, 36, 116, 118, 120, 122, 124 may have a separate further radio module 128, in particular a further radio module specifically associated with the respective component 14, 36, 116, 118, 120, 122, 124. The radio modules 126, 128 each comprise a transmitter (transmission antenna) and a receiver (receiver antenna). The radio modules 126, 128 replace the data line 38. The components 116, 118, 120, 122, 124 and the electronic unit 12 are connected to one another using communication technology (for example via BLE, LORA, WLAN, etc.) by means of the radio modules 126, 128. The radio modules 126, 128 are provided for the purpose of mutually transmitting the certificates 20, 22 and/or public keys 24, 28, 110 needed to carry out the copy protection method.

The invention claimed is:

1. An offline-capable copy protection method for an electronic system having at least one central or superordinate electronic unit and having at least one component which interacts with the electronic unit, in which at least one public-key infrastructure having at least one certification authority is used, wherein the certification authority issues respectively associated certificates including at least one first certificate for the electronic unit on the basis of an identification feature of the electronic unit and at least one second certificate for the at least one component on the basis of an identification feature of the at least one component, the method comprising:

transmitting at least the identification feature of the electronic unit that is used to issue the at least one first certificate to the certification authority via a transmission path that is independent from electronic data connections of the electronic unit, loading a specific public key of the at least one public-key infrastructure and a specific private key of the at least one public-key infrastructure onto the electronic unit when producing the electronic unit or when configuring the electronic unit, wherein the specific public key is stored in write-once memories of the electronic unit, and wherein the specific private key is stored in write-once memories of the electronic unit in a protected manner such that it cannot be read, and mutually checking, in order to check authenticity at least of the at least one component by means of the electronic unit, the respectively associated certificates including the at least one first certificate and the at least one second certificate, wherein at least the at least one first certificate is premade offline and is loaded onto the electronic unit offline, when producing the electronic unit or when configuring the electronic unit, or wherein at least the at least one second certificate is premade offline and is loaded onto the at least one component offline, when producing the at least one component or when configuring the at least one component.

2. The copy protection method as claimed in claim 1, wherein a further specific public key of the at least one public-key infrastructure and a further specific private key of the at least one public-key infrastructure are loaded onto the at least one component, when producing the at least one component or when configuring the at least one component.

3. The copy protection method as claimed in claim 2, wherein the further specific public key is stored in the write-once memories of the electronic unit or of the at least one component.

4. The copy protection method as claimed in claim 2, wherein the further specific private key is stored in the write-once memories of the electronic unit or of the at least one component in a protected manner such that it cannot be read.

5. The copy protection method as claimed in claim 1, wherein the at least one first certificate and the at least one second certificate are stored in rewritable memories.

6. The copy protection method as claimed in claim 1, further comprising transmitting at least one additional encrypted data element back and forth at least once between the electronic unit and the component by means of the at least one public-key infrastructure.

7. The copy protection method as claimed in claim 6, wherein the at least one additional encrypted data element is a time stamp.

8. The copy protection method as claimed in claim 1, wherein a list of identifiers of components or component groups compatible with the electronic unit is loaded onto the electronic unit when producing the electronic unit or when configuring the electronic unit.

9. The copy protection method as claimed in claim 8, wherein an identifier from the list of identifiers is assigned when producing the at least one component or when configuring the at least one component and is stored in a memory of the at least one component.

10. The copy protection method as claimed in claim 1, wherein the electronic unit is implemented as an electronic control device.

11. The copy protection method as claimed in claim 1, wherein the at least one component has at least one application-specific integrated circuit (ASIC), at least one field programmable gate array (FPGA) or at least one microcontroller (μC).

12. An offline-capable copy protection method for an electronic system having at least one central or superordinate electronic unit and having at least one component which interacts with the electronic unit, in which at least one public-key infrastructure having at least one certification authority is used, wherein the certification authority issues respectively associated certificates including at least one first certificate for the electronic unit on the basis of an identification feature of the electronic unit and at least one second certificate for the at least one component on the basis of an identification feature of the at least one component, and wherein, in order to check authenticity at least of the at least one component by means of the electronic unit, the respectively associated certificates including the at least one first certificate and the at least one second certificate are at least mutually checked, the copy protection method comprising:
at least one first method part and at least one second method part, the at least one first method part having the method steps:
setting up a data connection between the electronic unit and the at least one component,
transmitting the at least one first certificate from the electronic unit to the at least one component,
verifying the at least one first certificate by means of the at least one component,
storing locally permanently or temporarily a public key of the electronic unit by means of the at least one component after successful verification of the at least one first certificate,
transmitting the at least one second certificate from the at least one component to the electronic unit,
verifying the at least one second certificate by means of the electronic unit, and
storing locally permanently or temporarily a further public key of the at least one component by means of the electronic unit after successful verification of the at least one second certificate,
and the at least one second method part having the method steps:
generating a random number by means of the electronic unit,
generating a time stamp by means of the electronic unit,
storing locally or temporarily the random number and the time stamp by means of the electronic unit in a memory of the electronic unit,
encrypting a packet, which comprises at least the random number and at least one time stamp, by means of the further public key of the at least one component that is stored by the electronic unit,
transmitting the encrypted packet from the electronic unit to the at least one component,
decrypting the packet by means of the at least one component by means of a further private key of the at least one component,
adding a specific identifier assigned to the at least one component to the packet,
encrypting the packet which has been expanded by the specific identifier assigned to the at least one component by means of the public key of the electronic unit that is stored by the at least one component,
transmitting the expanded packet from the at least one component to the electronic unit,
decrypting the expanded packet by means of the electronic unit by means of a private key of the electronic unit,
comparing the time stamp from the decrypted expanded packet with the time stamp that is locally or temporarily stored in the electronic unit,
comparing the random number from the decrypted expanded packet with the random number locally or temporarily stored by the electronic unit in the memory of the electronic unit, and
matching the specific identifier from the decrypted expanded packet with identifiers from a list of identifiers which is stored in the electronic unit, with authenticity of the at least one component being confirmed by the electronic unit if the following three criteria are satisfied:
a) correspondence of the random number from the decrypted expanded packet with the random number locally or temporarily stored in the electronic unit,
b) correspondence of the time stamp from the decrypted expanded packet with the time stamp that is locally or temporarily stored in the electronic unit,
c) correspondence of the specific identifier to at least one identifier from the list of identifiers,
with a forgery or an incompatible component being identified by the electronic unit in the event of a discrepancy of the random number from the decrypted expanded packet with the random number locally or temporarily stored in the electronic unit, or numbers, in the event of a discrepancy of the time stamp from the decrypted expanded packet with the time stamp that is locally or temporarily stored in the electronic unit or if the specific identifier transmitted to the electronic unit is absent in the list of identifiers stored by the electronic unit.

13. The copy protection method as claimed in claim 12, further comprising:

when a forgery or an incompatible component is identified by the electronic unit, denying use of the forgery or use of the incompatible component within the electronic system.

14. The copy protection method as claimed in claim 12, further comprising:
carrying out or repeating the first method part and the second method part each time a component of the electronic system that interacts with the electronic unit is replaced or each time a component interacting with the electronic unit is newly installed.

15. The copy protection method as claimed in claim 12, further comprising:
carrying out or repeating, by means of the electronic unit, the second method part each time the electronic system is started.

16. An electronic system having an electronic unit and having one or more components each having pre-installed software or programming provided at least for the purpose of carrying out the copy protection method as claimed in claim 1.

17. An electronic system as claimed in claim 16, which is copy-protected, having at least one electronic unit and having at least one component which interacts with the electronic unit,
wherein the electronic unit is provided for the purpose of checking authenticity at least of the at least one component by mutually checking certificates of the at least one public-key infrastructure which are respectively associated with the electronic unit and the at least one component, wherein the electronic unit has a premade first certificate which is already installed when producing the electronic unit or when configuring the electronic unit, or
wherein the at least one component has a premade second certificate which is already installed when producing the at least one component or when configuring the at least one component.

18. The electronic system as claimed in claim 17, wherein the electronic unit has a specific public key of the at least one public-key infrastructure which is already installed when producing the electronic unit or when configuring the electronic unit, and has a specific private key of the at least one public-key infrastructure which is already installed when producing the electronic unit or when configuring the electronic unit, or
wherein the at least one component has a further specific public key of the at least one public-key infrastructure that is installed when producing the at least one component or when configuring the at least one component and has a further specific private key of the at least one public-key infrastructure that is already installed when producing the at least one component or when configuring the at least one component.

19. The electronic system as claimed in claim 17, further comprising offline checkability of the authenticity of the at least one component.

20. An electronic system having an electronic unit and having one or more components each having pre-installed software or programming provided at least for the purpose of carrying out the copy protection method as claimed in claim 12.

21. An electronic system as claimed in claim 20, which is copy-protected, having at least one electronic unit and having at least one component which interacts with the electronic unit,
wherein the electronic unit is provided for the purpose of checking authenticity at least of the at least one component by mutually checking certificates of the at least one public-key infrastructure which are respectively associated with the electronic unit and the at least one component, wherein the electronic unit has a premade first certificate which is already installed when producing the electronic unit or when configuring the electronic unit, or
wherein the at least one component has a premade second certificate which is already installed when producing the at least one component or when configuring the at least one component.

22. The electronic system as claimed in claim 21,
wherein the electronic unit has a specific public key of the at least one public-key infrastructure which is already installed when producing the electronic unit or when configuring the electronic unit, and has a specific private key of the at least one public-key infrastructure which is already installed when producing the electronic unit or when configuring the electronic unit, or
wherein the at least one component has a further specific public key of the at least one public-key infrastructure that is installed when producing the at least one component or when configuring the at least one component and has a further specific private key of the at least one public-key infrastructure that is already installed when producing the at least one component or when configuring the at least one component.

23. The electronic system as claimed in claim 21, comprising offline checkability of the authenticity of the at least one component.

* * * * *